March 18, 1941.   A. H. CHERRY   2,235,668
SEED SEPARATOR
Filed Dec. 21, 1939   4 Sheets-Sheet 1
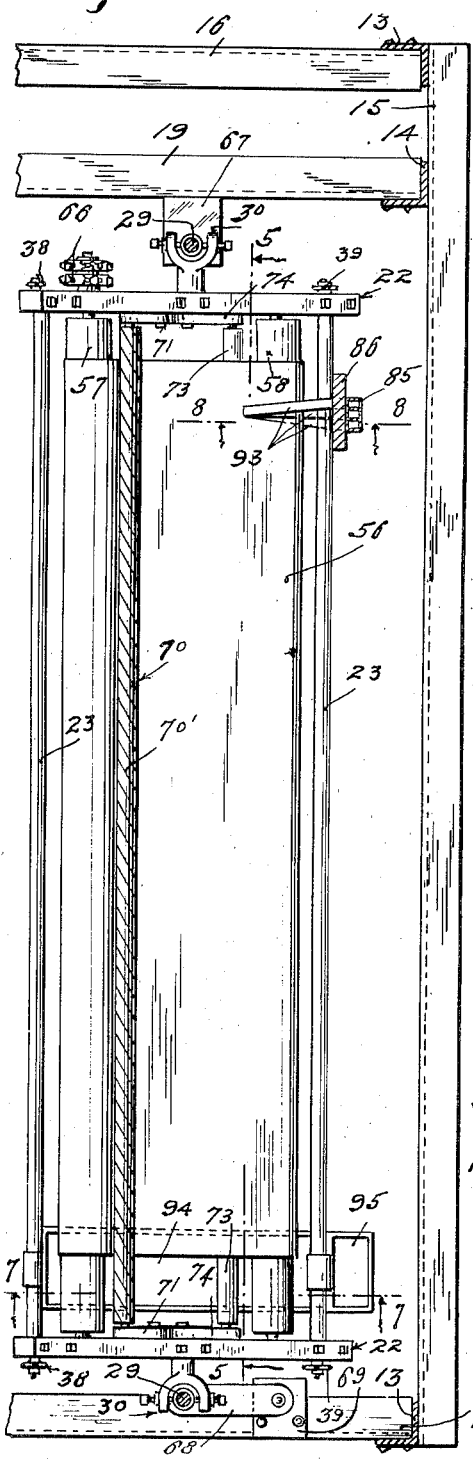
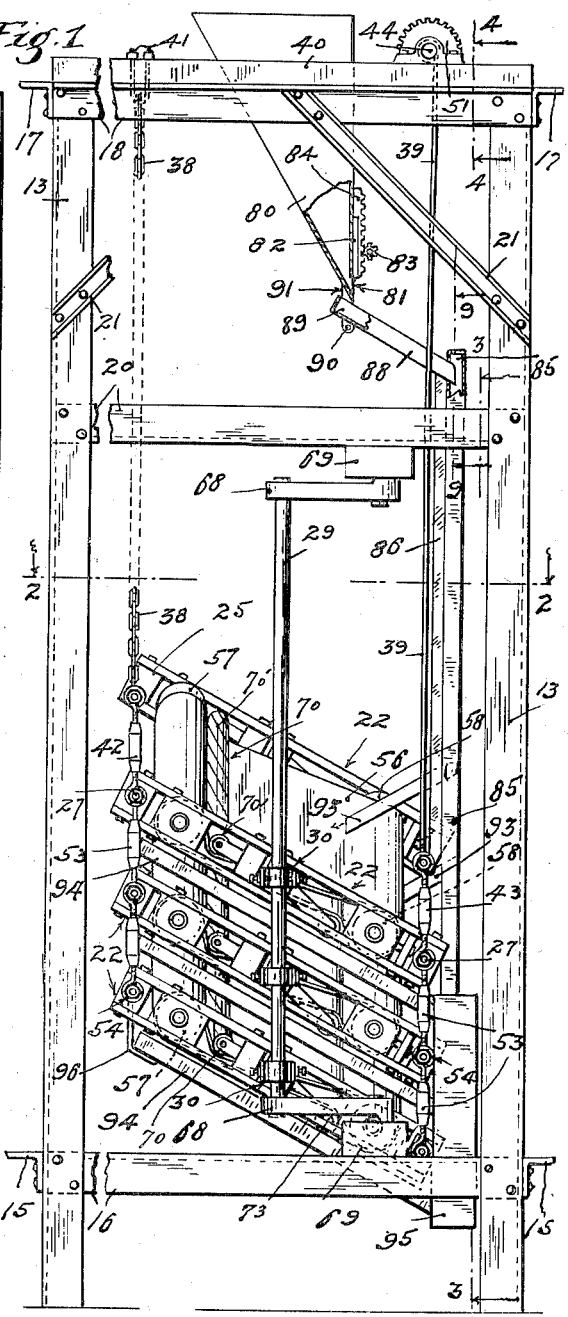
INVENTOR
Albert H. Cherry
By his Attorney
Harry D. Kilgore March 18, 1941.　　A. H. CHERRY　　2,235,668
SEED SEPARATOR
Filed Dec. 21, 1939　　4 Sheets—Sheet 2
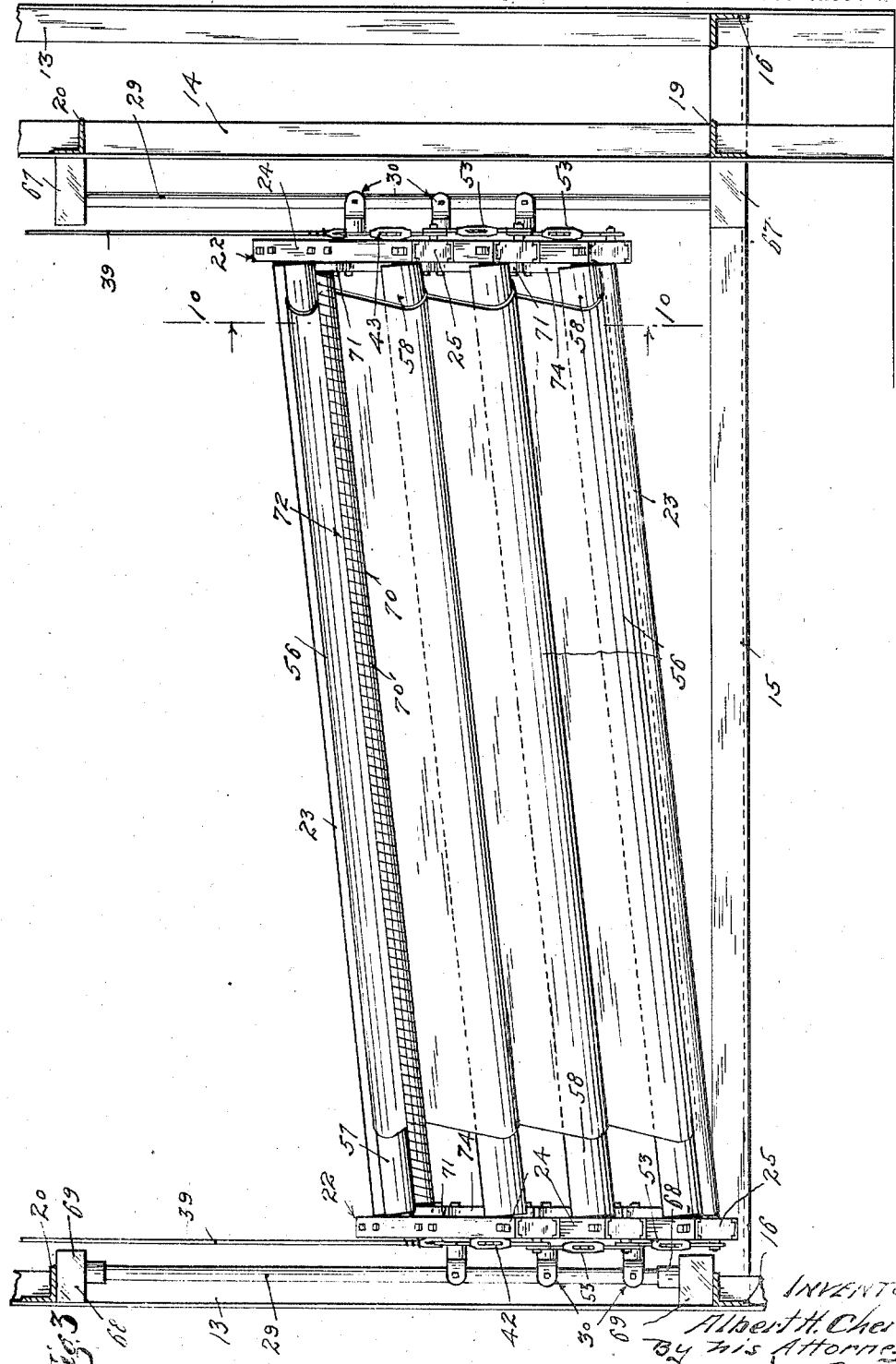

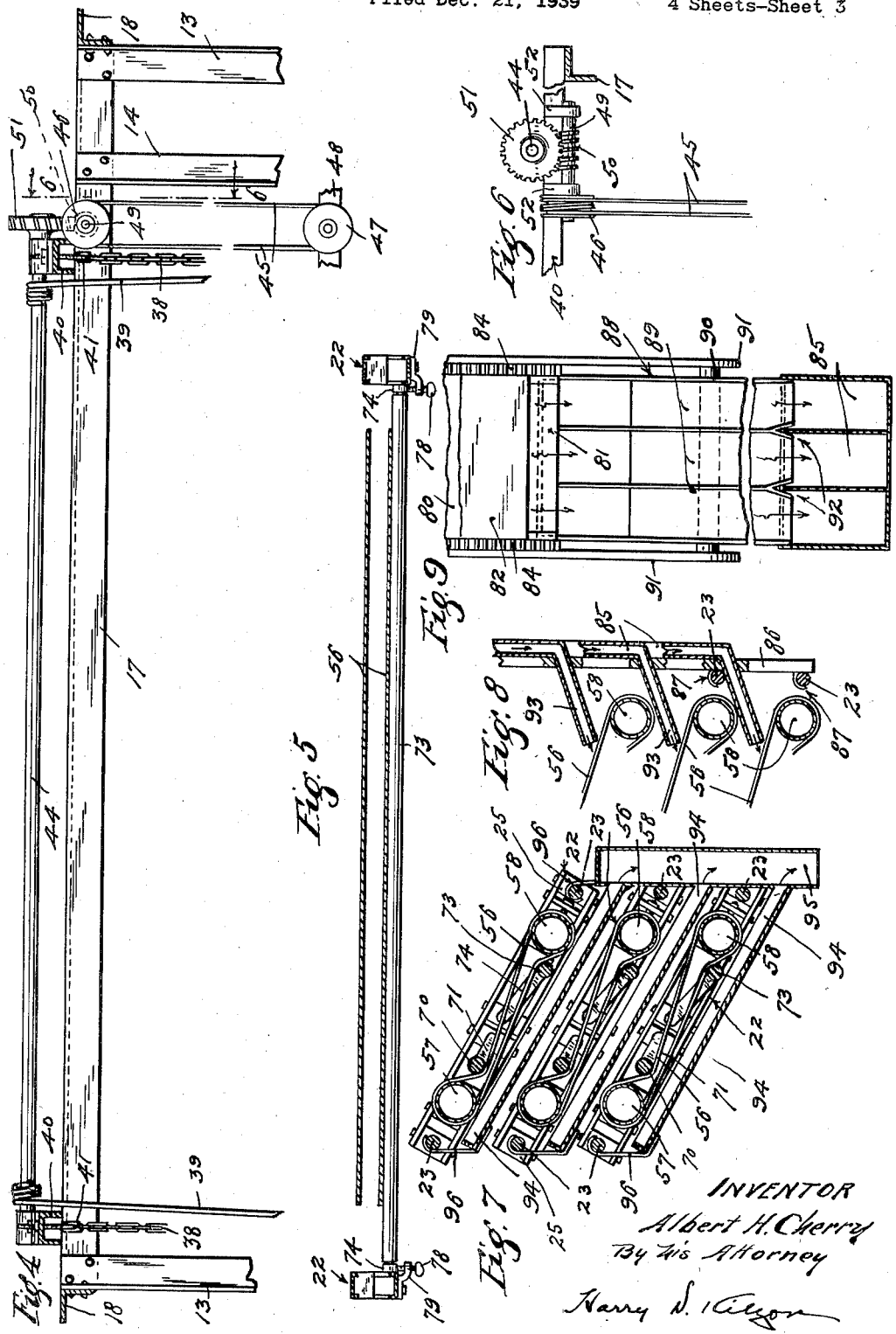

March 18, 1941.　　　A. H. CHERRY　　　2,235,668
SEED SEPARATOR
Filed Dec. 21, 1939　　　4 Sheets-Sheet 4

INVENTOR
Albert H. Cherry
By his Attorney
Harry H. Kilgore

Patented Mar. 18, 1941

2,235,668

UNITED STATES PATENT OFFICE 2,235,668

SEED SEPARATOR

Albert H. Cherry, Minneapolis, Minn.

Application December 21, 1939, Serial No. 310,347

10 Claims. (Cl. 209—114)

My invention relates to improvements in seed separators.

It is well-known that different kinds of seeds vary in roundness and hence a seed that is more nearly round will roll faster, on an inclined surface, than a seed that is not so round.

The object of my invention is to take advantage of this variation in the roundness of different kinds of seeds to provide an extremely simple and highly efficient machine for the separation of different kinds of seed.

While my invention is intended for general use in the separation of different kinds of seed, it is especially well adapted for separating mustard seed from clover seed, the former being more nearly round than the latter.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a view of the improved seed separator, principally in left-hand end elevation but with some parts broken away, other parts sectioned and still other parts shown in part by means of broken lines;

Fig. 2 is a fragmentary view principally in plan, but with some parts sectioned on the line 2—2 of Fig. 1;

Fig. 3 is a fragmentary view principally in front elevation, but with some parts sectioned on the line 3—3 of Fig. 1 and other parts removed;

Fig. 4 is a fragmentary detail view with some parts sectioned on the line 4—4 of Fig. 1;

Fig. 5 is a detail view with some parts sectioned on the line 5—5 of Fig. 2;

Fig. 6 is a detail view principally in end elevation, but with a member of the main frame sectioned on the line 6—6 of Fig. 4;

Fig. 7 is a view principally in section taken on the line 7—7 of Fig. 2;

Fig. 8 is a detail view principally in section taken on the line 8—8 of Fig. 2;

Fig. 9 is a detail view principally in front elevation but with some parts sectioned on the line 9—9 of Fig. 1, on an enlarged scale;

Fig. 10 is a detail view partly in elevation and partly in section taken on the line 10—10 of Fig. 3, on an enlarged scale;

Fig. 11 is a fragmentary detail view partly in plan and partly in section taken substantially on the irregular line 11—11 of Fig. 10; and Fig. 12 is a fragmentary detail view partly in plan and partly in section taken substantially on the line 12—12 of Fig. 10.

The main frame of the improved seed separator, as shown, is made up of commercial angle bars and comprises four corner posts 13, a pair of intermediate posts 14, located relatively close to the right-hand end of the frame, a pair of lower longitudinal members 15 and a pair of lower end members 16, in rectangular arrangement and rigidly connecting the posts 13 and 14, near their lower ends, a pair of upper longitudinal members 17 and a pair of upper end members 18 in rectangular arrangement and rigidly connecting the posts 13 and 14 at their upper ends. The posts 14 are further connected in the plane of the members 15 and 16 by a transverse member 19 and the left-hand pair of posts 13 and the intermediate posts 14 are still further connected by a pair of transverse intermediate members 20. Corner braces 21 connect the corner posts 13 to the upper end members 18.

Within the main frame is a series of secondary frames, as shown three, but in actual commercial use of my improved seed separator, there will be two series of these secondary frames and there will be sufficient number thereof in each series to substantially fill the entire space between the lower end members 16—19 and the intermediate members 20.

The secondary frames are identical, the one with the other, and each thereof comprises a pair of end members 22 and a pair of longitudinal members 23 in rectangular arrangement and horizontally disposed. Each end member 22, see Figs. 10–11 and 12 comprises a pair of parallel shallow channel members 24, spaced the one above the other with their flanges turned toward each other, and a pair of end blocks 25. These end blocks 25 are interposed between the channel members 24 and rigidly connected thereto by machine screws 26. The longitudinal members 23, as shown, are pipes, having on their ends axially aligned screw studs 27 which extend through center holes in the end blocks 25. Nuts 28 applied to the screw studs 27 impinge against outer faces of the end blocks 25 and hold the ends of the longitudinal members clamped against the inner faces of said blocks and thereby rigidly connect the end members 22 and the longitudinal members 23.

Each secondary frame is mounted, at its ends, upon a pair of shafts 29 by means of a pair of swivels 30, each of which includes a collar 31 and a bifurcated head 32. The collars 31 are slidably mounted on the shafts 29 with freedom for turning movement thereon. The heads 32 are horizontally disposed and their prongs straddle the collars 31 and are pivotally connected thereto by pairs of opposing axially aligned set screws 33 having screw-threaded engagement with said prongs and with their inner ends mounted in diametrically opposite seats in said collars. One of the heads 32 is secured at its longitudinal axis to each end member 22 by a long machine screw 34 which extends through a center hole in a block 35 from the inner side thereof and has screw-threaded engagement with said block and head.

By reference to Fig. 11 it will be noted that the head 32 is spaced from the block 35 to permit said head to turn on the screw 34. The block 35 extends between the two channel members 24 of the respective end frame 22 and is secured thereto for relative longitudinal adjustment by a pair of axially aligned machine screws 36 which extend through slots 37 in the transverse portions of said members and have screw-threaded engagement with said block. It will be noted that the blocks 35 are at substantially the longitudinal centers of the end members 22 and that the swivels 30 permit raising or lowering movements of the secondary frame at either end as well as tilting movement about a horizontally disposed axis.

The uppermost secondary frame is held suspended at its two uppermost corners by a pair of chains 38 and at its two lowermost corners by a pair of wire cables 39. The chains 38, at their upper ends, are anchored to a pair of transverse inverted channel bars 40 by U-bolts 41 and are adjustably attached at their lower ends to the screw studs 27 of the respective longitudinal member 23 by turn-buckles 42. The cables 39 at their lower ends are adjustably attached to the screw studs 27 of the respective longitudinal member 23 by turn-buckles 43. Said cables 39, at their upper ends, are wound on a horizontal shaft 44 journaled in bearings on the channel bars 40. These channel bars 40 are supported at their ends on the longitudinal members 17 and rigidly secured thereto.

The shaft 44 is rotated to wind the cables 39 thereon or unwind the same therefrom by an endless cable 45 which runs over and is wrapped around upper and lower grooved pulleys 46 and 47, respectively. The lower pulley 47 is journaled on a member 48 secured to the main frame at the front thereof and the upper pulley 46 is fixed on the front end of a short shaft 49 which carries a worm 50 that meshes with a worm gear 51 fixed on the right-hand end of the shaft 44. Said shaft 49 is journaled in bearings 52 on the adjacent channel bar 40. Obviously, the worm 50 will hold the shaft 44 against rotation except when said worm is turned by manipulating the cable 45.

The secondary frames, below the uppermost one, are held suspended, at their four corners, from each other and from said uppermost frame, by means of turn-buckles 53. These turn-buckles 53 are attached to the screw studs 27 outwardly of the nuts 28 and held thereon by nuts 54. To prevent the turn-buckles 53 from being pinched between co-operating pairs of nuts 28 and 54, spacing sleeves 55 are telescoped onto the studs 27 and through the eyes in the turn-buckles 53. These spacing sleeves 55 limit the movement of the nuts 54 toward the nuts 28 and permit free turning movement of the turn-buckles 53 on the studs 27. Obviously, the turn-buckles 53 permit the secondary frames to be independently and vertically adjusted at any one of their four corners. The chains 38 and the cables 39 are adjusted to hold the secondary frame upwardly inclined from the front to the rear thereof and downwardly inclined from the right-hand end to the left-hand end thereof.

Mounted in each secondary frame is a wide seed-separating belt 56 made of rubber or any other suitable material having a relatively smooth resilient outer surface or face. This belt 56 is arranged to run over a driven upper roll 57 and an idle lower roll 58. The upper roll 57 is journaled at its ends in ball bearings, not shown, mounted in a pair of blocks 59 interposed between the channel members 24 of each pair and rigidly secured thereto by machine screws 60. The lower roll 58 is also journaled in ball bearings, not shown, mounted in a pair of adjustable blocks 61 interposed between the channel members 24 of each pair. These blocks 61 are free for sliding movement longitudinally in said channel members toward or from the blocks 59 and are held by the flanges of said members for straight line sliding movement.

To hold the blocks 61 against movement toward the blocks 59 by the pull of the belt 56 thereon, each of the blocks 61 is provided at its outer end with a central screw stud 62 which loosely extends through a hole in an anchor block 63 and a nut 64 applied thereto.

The anchor blocks 63 are interposed between the channel members 24 of the two pairs and rigidly secured thereto by machine screws 65. The nuts 64 on the screw studs 62 impinge against the outer faces of the anchor blocks 63 and hold the sliding blocks 61 where adjusted.

For the purpose of this case, it is not thought necessary to show the driving connections for the driven rolls 57 except to state that one of the rolls 57 will be positively driven from an electric motor or other suitable source of power, and the other rolls 57 will be driven therefrom by chains that run over sprocket wheels on the shafts of said rolls, two of which are shown in Fig. 2 and designated by the numeral 66.

Referring again to the shafts 29, it will be noted, by reference to Fig. 3, that the shaft 29, at the right-hand end of the separator, is fixed in upper and lower bearing blocks 67 rigidly secured to the frame member 19 and the right-hand frame member 20, respectively. The left-hand shaft 29 is secured at its ends in a pair of crank arms 68 pivoted to blocks 69 rigidly secured to the left-hand frame members 16 and 20. See Figs. 1 and 2. These crank arms 68 permit lateral movement of the respective shaft 29 in respect to the fixed shaft 29 to compensate for varying distances between the two shafts 29 as the transverse inclinations of the secondary frames are varied.

The separating belts 56 travel in the direction of the arrows shown in Fig. 10 and as the upper section of each belt 56 approaches the upper roll 57, the same passes under an agitator roll 70 for a mixture of different kinds of seeds being separated, as will hereinafter appear. This roll 70 performs another important function, to wit: it acts as a directional roll for the belt 56. Said agitator roll 70 is loosely journaled at its ends in a pair of arms 71 pivoted to blocks 71ᵃ by means of machine screws 71ᵇ. After the agitator roll 70 is properly adjusted, the arms are frictionally clamped by the screws 71ᵇ between the heads of said screws and the inner faces of the blocks 71ª and thereby hold the roller 70 where adjusted.

The blocks 71ª are slidably mounted in the channel members 24 of the two end members 22. These blocks 71ª are adjustably secured to the channel members 24 by machine screws 71ᶜ which extend through longitudinal slots 71ᵈ in the transverse portions of said members and have screw-threaded engagement with the blocks 71ª.

The roll 70 holds the belt 56 between the roll 58 and said roll 70 at an inclination that is considerably less than the inclination of the secondary frame, and this inclination of the belt 56 may be varied, at will, to a certain extent, by raising or lowering the roll 70. The inclination of the belt 56, between the roll 70 and the roll 57, is very steep and this inclination may be varied, at will, by adjusting the blocks 71ª to move the roll 70 toward or from the roll 57. It is important to note that roll 70 and the section of the belt 56 between said roll and the roll 57 forms a V-shaped trough 72 that is downwardly inclined from the right-hand edge of the belt 56 to the left-hand edge thereof. The roll 70 is covered by a relatively thick cylindrical shell or facing 70' of rubber or any other suitable resilient material. As shown, this facing 70' is in the form of a ribbon spirally wound on the roll 70 and is secured thereto in any suitable manner.

I provide a tightener for the belt 56 in the form of a roll 73 which is closely positioned to the roll 58, extends parallel or substantially parallel thereto, and the lower section of the belt 56 runs over the same, see Fig. 10. This belt tightener 73 is journaled at its ends on a pair of arms 74 pivoted to the inner end portions of the screws 34. The roll 73 is adjustably held against movement away from the belt 56 by thumb screws 78 having screw-threaded engagement with brackets 79 on the lower channel members 24 and impinge against the lower edge portions of the arms 74. See Figs. 5 and 10. By adjusting the thumb screws 78 the tension of the belt 56 may be varied, at will. As each end of the belt tightener roll 73 is independently adjustable to raise or lower the same, said roll may be angularly adjusted to place more tension on the belt 56 at one of the edge portions than on the other to prevent edgewise drifting of the belt 56 on the rolls 57 and 58. The belt tightener roll 73 may be bodily moved toward or from the roll 58 by adjusting the blocks 35 relative to the channel members 24.

A mixture of seeds to be separated is delivered into a hopper 80 from a bin or other source of supply, not shown. This hopper 80, which is mounted on the main frame at the top thereof, has in its lower end a discharge opening 81, the conducting capacity of which may be varied, at will, by a vertically adjustable gate 82. Said gate 82 may be raised or lowered by means of a pair of pinions 83, only one of which is shown, journaled on said gate and meshing with a pair of racks 84 on the front of the hopper 80 and which racks also act as guides of the gate 82. Any suitable means, not shown, may be provided for operating the pinions 83. To assure an even distribution of the seed mixture from the hopper 80 to the several seed separating belts 56, the following spouting system is shown. This spouting system includes three vertical spouts 85, one for each belt 56, secured to a board or other backing 86. This backing 86 is secured to two or more of the secondary frame members 23 by clips 87 which support the spouts 85 therefrom for vertical adjustment therewith.

The seed mixture from the hopper 80 flows through the discharge 81, under the gate 82, and onto a forwardly and downwardly inclined deck 88, having thereon three channels 89 which lead one into each spout 85. See Figs. 1 and 9. The deck 88, at its upper end portion, loosely rests on a shaft 90 secured at its ends in hanger brackets 91 on the sides of the hopper 80. Said deck 88, at its lower end portion, extends into the spouts 85 through apertures therein and rest on the back of said spouts. To insure the delivery of all of the seed mixture in any one of the channels 89 on the deck 88 into the spout 85 with which it is aligned, the partitions between the several channels 85 are forked at 92 and straddle the partitions between the spouts 85. See Fig. 9. This forked engagement of the channel partitions with the spout partitions also hold the deck 88 against endwise sliding from the hopper 80.

Each spout 85 at its lower end is provided with a spout extension 93 that is downwardly inclined over one of the belts 56 with its delivery end closely positioned thereto. These spout extensions 93 are arranged to deliver seed onto the several belts 56 at exactly the same point. See Fig. 2.

Separated seed discharged from each belt 56 at its lowermost edge is precipitated into an open pan 94 that extends transversely in part under the lowermost end portion of the respective secondary frame and has the same inclination as said frame. All of the pans 94 at their lowermost ends discharge into a vertical leg 95 having an open bottom. The several pans 94 and the leg 95 are secured to the secondary frame by clips 96 that hook over certain of the frame members 23. See Fig. 7. Seed discharged from the leg 95 may be caught in a receptacle placed under said leg or conveyed to any suitable place.

*Operation*

The operation of the improved seed separator may be briefly described as follows: As heretofore stated, the invention is intended for general use in the separation of seeds of different kinds, but it is especially well adapted to remove mustard seed from clover seed and will so be described.

It may be assumed that a mixture of clover seed and mustard seed is being delivered into the hopper 80 from a bin or other source of supply, not shown, and that the gate 84 is adjusted for the desired flow of the seed mixture through the discharge opening 81 for an even distribution thereof into the several channels 89, and from thence into the aligned spouts 85 to their extensions 93 where the same is delivered onto the upwardly moving surfaces of the respective belts 56 near their uppermost edge portions. See Figs. 1 and 8.

As the separation of seeds on each belt 56 is identical, the one with the other, the description of the operation of the one will suffice for the other.

The seed mixture delivered onto one of the belts 56 is carried upwardly thereon to the agitator roll 70 where the same, in a thin layer, passes under said roll and into the trough 72. Due to the sharp change in the inclination of the belt 56 after it leaves the roll 70, further travel of the seed mixture thereon is stopped and hence the trough 72 will be filled with the seed mixture.

It may be here stated that seeds passing under the roll 70 act as ball bearings between the belt 56 and said roll. Obviously, the turning roll 70 materially assists in feeding the seed mixture between the belt 56 and said roll to the trough 72. Due to the resilient surfaces or faces of the belt 56 and the roll 70, seeds passing therebetween will not be injured.

From the filled trough 72, the seed mixture will overflow and as the same cannot travel further on the belt 56, it will flow in a thin even stream onto the top of the roll 70 and be carried thereby in an opposite direction from which it has been travelling on the belt 56. As the seed mixture on the roll 70 is carried forwardly thereby, the same is precipitated therefrom in a thin even stream onto the upwardly moving surface of the belt 56. As the seed mixture strikes the upwardly moving surface of the belt 56, an accumulation thereof will take place against the roll 70 and said accumulation will roll about an imaginary axis that extends parallel to said roll. During the rolling of the seed mixture on the belt 56, some of said mixture will start to roll downward on said belt and as the mustard seed will roll faster than the clover seed, the same will be separated therefrom and continue to roll downwardly on the belt 56 while the clover seed will be carried by the belt 56 back to the roll 70.

During this movement of the seed mixture, designated by the letter x, around the agitator roll 70, the same will also be travelling in the trough 72 and on the belt 56 transversely of said belt toward the lowermost edge thereof. As the downwardly rolling mustard seed on the belt 56 reaches the roll 58, it will be precipitated from said belt. Obviously, as the seed mixture moves toward the lowermost edge of the belt, the amount of mustard seed in the clover seed progressively decreases and by the time the clover seed reaches the lowermost edge of the belt 56, the mustard seed will have been removed therefrom. At the lowermost edge of the belt 56, the clover seed in the trough 72 and on the belt 56 will be precipitated into the respective catch pan 94 and slide downwardly on the inclined bottom thereof and into the leg 95.

From the above statement of operation, it is evident that the seed mixture in the trough 72 and on the belt 56 at the uppermost edge of said belt will progressively travel in the downwardly inclined trough 72 and on the transversely inclined surface of the belt 56, as said seed mixture is successively carried around the roll 70. It is, of course, evident that the agitator roll 70 is rotated by friction from the travelling belt 56.

The independently adjustable sliding blocks 61 permit the roll 58 to be angularly set relative to the roll 57 to properly hold and guide the belt 56. The adjustable blocks 35 permit the belt-tightening roll 73 to be moved bodily toward or from the roll 58 or moved angularly thereto. By manipulating either one or both of the thumb screws 78, the belt-tightening roll 73 may be adjusted to put the desired tension on the belt 56 or said roll may be angularly set to prevent the belt 56 from drifting edgewise on the rolls 57 and 58.

The blocks 71ª may be adjusted on the channel members 24 to move the agitator roll 70 toward or from the roll 57 or the frictionally held arms 71 may be adjusted to raise or lower the roll 70.

By manipulating the turn-buckles 53, the secondary frames may be adjusted at their four corners relative to each other and by adjusting the turn-buckles 42 and 43, all of the secondary frames suspended therefrom may be raised or lowered at any one of their four corners.

The inclination of the upwardly moving surface of the belt 56 may be varied, at will, for the separation of seed in a given mixture by turning the worm 50, by means of the cable 45, to wind the cables 39 thereon and thereby raise the front ends of the secondary frames, or to unwind said cables 39 therefrom, and thereby lower said ends of the secondary frames.

Obviously, during adjustment of the secondary frames to change the inclination of the belts 56 either in the direction of the travel thereof or transversely thereof, the swivels 30 are free to slide longitudinally on the shaft 29 or to move angularly transversely of said shaft, and the shaft 29 carried by the crank arms 68 is free to move laterally toward or from the fixed shaft 29.

During adjustment of the secondary frames, the spouts 85 and their extensions 93 move therewith as well as the catch pans 94 and the leg 95. As the spouts 85 are moved vertically with the secondary frames, the deck 88, which is loosely supported on the shaft 90 and the spouts 85, will keep its set position to receive a seed mixture from the discharge opening 81 and deliver the several streams thereof in the channels 89 into the respective spouts 85.

After the improved seed separator has once been adjusted for the separation of seed in a given mixture, the same will need no further attention and a single attendant may look after one or more machines having a plurality of separating belts.

The drawings illustrate a commercial form of the invention, but it will be understood that the same is capable of certain modifications as to details of construction, arrangement and combination of parts within the scope of the invention herein disclosed.

Referring again to the belt-tightening roll 73, the angular adjustment thereof relative to the separating surface of the belt 56 is highly important for the reason that when properly adjusted, said roll keeps said separating surface perfectly smooth without wrinkles or waves, which is absolutely necessary for the successful separation of seed, as heretofore described.

It may be stated that the bearings used for the rolls 57—58—70 and 73 are self-aligning ball bearings.

What I claim is:

1. In a separator of the kind described, a belt having an upwardly and transversely inclined separating surface, and a co-operating agitator roll extending transversely over the separating surface and engaged by the belt, and means for changing the direction of movement of the belt from the agitator roll and thereby forming a trough between the belt and the agitator roll, means for depositing materials to be separated on the separating surface at the uppermost edge portion thereof, whereby said materials will be carried by the belt under the agitator roll and into the trough where the same will overflow onto the agitator roll and be returned thereby onto the separating surface.

2. The structure defined in claim 1 in which the agitator roll has a resilient face.

3. The structure defined in claim 1 in which the agitator roll has a rubber facing.

4. The structure defined in claim 1 in which a relatively thick cylindrical rubber shell surrounds the agitator roll.

5. The structure defined in claim 1 in which the face of the belt is relatively soft rubber.

6. The structure defined in claim 1 in which the agitator roll is driven by friction from the belt.

7. In a separator of the kind described, a front roll and a rear roll, the latter being above the former, a wide belt arranged to run over said rolls, said rolls holding the belt transversely inclined, the upper section of the belt affording an upwardly inclined separating surface, means for driving one of the rolls in a direction in which the separating surface is moved thereby upwardly from the lower roll, and an agitator roll extending transversely over the separating surface and engaged by the belt, said agitator roll being closely positioned to the upper roll and arranged to change the direction of movement of the belt and thereby form a trough between the belt and the agitator roll, means for depositing materials to be separated onto the separating surface at the uppermost edge portion thereof, whereby said materials will be carried by the belt under the agitator roll and into the trough where the same will overflow onto the agitator roll and be returned thereby onto the separating surfaces.

8. The structure defined in claim 7 in which the agitator roll is driven from the belt by friction.

9. The structure defined in claim 7 which further includes a tightener for the belt in the form of a roll which extends transversely of the belt and engages the same, and means for adjusting said roll at either end to vary the tension of the belt at the respective edge portion and prevent the belt from drifting edgewise on the upper and lower rolls.

10. The combination with a main frame, of a horizontally disposed rectangular secondary frame in the main frame, a pair of upright shafts on the main frame, one of said shafts being free for movement toward or from the other thereof, swivels connecting the secondary frame at its ends to the shafts with freedom for raising or lowering movements thereon, a front roll and a rear roll journaled on the secondary frame at the ends thereof, a wide belt arranged to run over said rolls, the upper section of the belt affording a separating surface, means for driving one of the rolls in a direction in which the separating surface is moved thereby from the front roll toward the rear roll, cables holding the secondary frame at its corners suspended from the main frame and with the separating surface upwardly and transversely inclined, a shaft journaled on the main frame and on which the two front cables are wound, means for turning the shaft to lengthen or shorten the operative length of the respective cable and thereby change the inclination of the separating surface in the direction of movement thereof, and an agitator roll journaled on the secondary frame and extending transversely over the separating surface and engaged by the belt, said agitator roll being closely positioned to the rear roll and arranged to change the direction of movement of the belt and thereby form a trough between the belt and the agitator roll, whereby materials to be separated discharged onto the separating surface at the uppermost edge portion thereof will be carried by the separating surface under the agitator roll and into the trough where the same will overflow onto the agitator roll and be returned thereby onto the separating surface.

ALBERT H. CHERRY.